Patented Sept. 5, 1933

1,925,389

UNITED STATES PATENT OFFICE 1,925,389

CATALYTIC REDUCTION OF CARBONYL COMPOUNDS

Alphons O. Jaeger, Crafton, Pa., assignor to The Selden Company, Pittsburgh, Pa., a corporation of Delaware No Drawing. Original application February 21, 1928, Serial No. 256,065. Divided and this application April 6, 1929. Serial No. 353,270

18 Claims. (Cl. 260—169)

This invention relates to the catalytic reduction of compounds containing or consisting of carbon linked to oxygen such as oxides of carbon, ketones, aldehydes, acids, esters, alcohols, ethers, etc. to hydrocarbons or hydrocarbon mixtures.

According to the present invention such compounds are reduced by means of hydrogen or gases containing hydrogen to hydrocarbons in the presence of a new class of contact masses. The contact masses used in the present invention contain base exchange bodies or their derivatives. Under the term "base exchange body" are included all natural or artificial bodies which possess the properties of exchanging their bases for other bases of salt solutions. The base exchanging products used in making catalytic compositions of the present invention or as initial material for derivatives to be so used may possess high base exchanging power or in many cases may possess lower base exchanging power, since the catalytic value of the final compositions is not primarily dependent on the amount of base exchanging power present. In general the base exchange bodies may be divided into three main categories:—Two-component and multi-component zeolites, i. e., base exchange bodies containing chemically combined silicon in their nucleus and non-siliceous base exchange bodies in which all of the silicon is replaced by other suitable acidic or amphoteric metal oxides. Two-component zeolites are the reaction products of two types of initial components, that is to say, metallates and silicates, (using the term metallate in a somewhat broader sense as will be defined further on in the description), or metal salts and silicates. Frequently more than one member of a type may enter into reaction, that is to say a silicate may react with more than one metallate or more than one metal salt. The multi-component zeolites are the reaction products of at least three types of components, that is to say at least one silicate, at least one metallate, and at least one metal salt.

The base exchange bodies, both zeolites and non-siliceous base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-siliceous base exchange bodies, may also be transformed into derivatives which possess many of the chemical and most of the physical characteristics of the parent base exchange bodies. Such derivatives may be salt-like bodies, that is to say the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and the more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in four main forms, as follows:—(1) They may be physically admixed with or impregnated into the permutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously, of course, the same or different catalytically active components may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the reductions of carbonyl compounds and in all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly in the sensitive reactions such as certain reductions of oxides of carbon for which contact masses used in the present invention are peculiarly adapted.

In addition to the important characteristics with which permutogenetic products endow the contact masses of the present invention it has been found that for many of the reactions coming within the scope of the present invention it is desirable to stabilize the contact masses, and this may be effected by associating with the permutogenetic products or incorporating or forming therein compounds of the alkali forming metals, that is to say, the alkali metals and the alkaline earth metals. These compounds appear to slow up or smooth out the catalytic reaction, and will be referred to throughout this specification as stabilizers. The stabilizers may be non-alkaline, weakly alkaline or strongly alkaline. For the production of petroleum, like hydrocarbon mixtures it is preferable to use strongly alkaline stabilizers. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers which are important in a large number of reductions and hydrogenations included in the scope of the present invention, it has been found that the stabilizer action and the overall efficiency of the contact masses can in many cases be greatly increased or enhanced by the association therewith or chemical combination therein of elements or radicals or groups which are catalytically active but do not possess specific catalytic activity for the particular reaction to be carried out. Thus, for example, in the case of a hydrogenation reaction, certain catalysts which at the temperatures used in the reaction behave as dehydrogenation catalysts may be added to enhance and tone the catalytic activity of the catalysts or the operation of the stabilizers. Similarly in some cases oxidation catalysts, such as those containing metal elements of the fifth and sixth groups of the periodic system may greatly improve the effectiveness of the contact mass used, especially where it is desirable to produce intermediate products which in some cases are relatively unstable. Some other reduction reactions involve the splitting off of water, and may also involve molecular condensations. In such reactions it is very desirable to incorporate catalysts or catalytic components which are not specific reduction catalysts but which may favor dehydration, splitting off of carbon dioxide or condensation. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are no stabilizers.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared in any of the well known methods. Thus for example, two-component zeolites may be prepared by wet methods, in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two-component zeolites of high base exchanging power are needed to add the relatively acid components, for example, metal salts in the case of aluminum double silicate type of sylicates, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products, in which preferably the diluents are homogeneously incorporated into the base exchange bodies before formation of the latter, or at least before the base exchange body has set after formation. Many diluents, both inert, stabilizing, activating, catalytically active, or having stabilizer promoter effects, can be used. A few of the diluents will be briefly enumerated:—kieselguhrs of all kinds, particularly natural or treated "Celite" earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used. Examples of methods for incorporating diluents are described in detail in the copending application of Jaeger and Bertsch, Serial No. 95,771, filed March 18, 1926, and any of the methods described can be used in incorporating diluents in the present invention:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies, which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for the catalytic reductions and hydrogenations of carbonyl compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course, that the nucleus behaves as a single group. The metal compounds which are capable of forming the basic portion of the nucleus are those of the following metals:— copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular reduction or hydrogenation reaction for which the final contact mass is to be used, and the choice of catalysts and stabilizer promotors together with the proportions will be determined by the particular catalytic reduction or hydrogenation of the particular carbonyl compounds for which the contact mass is to be used.

Examples of components forming the relatively acid portion of the base exchange nucleus are alkali metal silicates, which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonium, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical strength, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro and ferricyanogen, certain ammonia complexes and the like. The amount of acid radicals caused to unite the base exchange bodies to form salt-like bodies may be varied so that the resulting products may possess the character of acid, neutral or basic salts. Most of these acid radicals are stabilizers or stabilizer promoters for the catalytic reduction and hydrogenation of carbonyl compounds to various hydrocarbon products.

The base exchange bodies diluted or undiluted, or some of their salt-like body derivatives, may be treated with acids, such as mineral acids, for example, 2-10% sulfuric, hydrochloric or nitric acids, to remove part or all of the exchangeable bases, or also part or all of the basic portion of the nucleus.

In the case of zeolites, the partial leaching with acids, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same but the remainder is of course a form of silica, or in the case of zeolites in which part of the silica is replaced by other acidic compounds, a mixture of the two, and usually will not be a specific catalyst for the reduction or hydrogenation of oxides of carbon. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalysts, stabilizer promoters or both, and many important catalysts for the reduction and hydrogenation of carbon-oxygen compounds are thus obtained. This is particularly the case for reactions where a relatively alkali-free contact mass is required for best results and where the alkali content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, minerals, especially copper minerals, fall within this class. Aluminum or copper alloy granules perform an additional advantageous function in that their relatively high heat conductivity tends to prevent local overheating in highly exothermic reductions or hydrogenations of carbonyl compounds, which is of considerable importance in obtaining good yields, as many of the reactions, particularly hydrogenations, are equilibrium reactions, and at higher temperatures hydrogenation catalysts reverse their function and tend to favor dehydrogenation with resulting lowering of yields and contamination of the product.

The present invention is applicable to all reductions and hydrogenations of compounds containing or consisting of carbon linked to oxygen in which at least part of the reduction is effected on the carbon-oxygen group. One of the most important series of reductions and hydrogenations consists in the reduction or hydrogenation of oxides of carbon, such as carbon monoxide, carbon dioxide, and the like. These compounds can be reduced in the vapor phase by means of the contact masses described above containing permutogenetic bodies to various oxygen free products. Thus for example, in the absence of condensation catalysts such as for example alkalis, oxides of carbon, may be reduced to methane. So for instance, the milder reduction catalysts, particularly when toned with stabilizer promoters in the form of oxidation catalysts, preferentially produce formaldehyde and methyl alcohol, whereas when strong reduction or hydrogenation catalysts such as cobalt, nickel, iron, etc., are present the tendency is to produce methane, especially in the presence of dehydration stabilizer promoters. Under somewhat different reaction conditions, and particularly in the presence of contact masses which have components such as alkaline stabilizers that favor condensation the tendency is to produce higher hydrocarbons, many of them being of petroleum like character, especially when a large amount of strong alkalies are present in the contact mass, and most of the products are useful for motor fuels either with or without subsequent refining.

In addition to reactions in which a more or less homogeneous raw material is reduced certain mixtures of raw materials may be effectively reduced with or without the presence of additional reducing gases. Thus for example, oxides of carbon may be reduced in the presence of the vapors of many organic compounds. For example, they may be reduced in the presence of aliphatic hydrocarbons, such as paraffins, olefines, acetylenes, hydrocarbons having the formula $C_nH_{2n-4}$, $C_nH_{2n-6}$, etc. Hydrogen may be present or absent, and the class of products obtained, such as mixtures of oxygenated compounds, or in many cases oils which are predominately hydrocarbon in their nature, will vary with the amount of the reacting ingredients and with the contact masses and reaction conditions used, and it is an advantage of the present invention that these novel combined reductions can be carried out in the desired direction with great effectiveness by the incorporation of suitable stabilizer promoters or stabilizers in the contact masses.

Another class of combined reaction consists in the reduction of oxides of carbon with or without hydrogen in the presence of vapors of aliphatic alcohols such as paraffin alcohols having the formula $C_nH_{2n+1}OH$, or unsaturated alcohols having the formula $C_nH_{2n-1}OH$, or $C_nH_{2n-3}OH$, etc. Polyvalent alcohols such as glycol, glycerol and the like, may be reduced in combination with oxides of carbon with or without hydrogen.

Oxidation products of alcohols, such as for example, saturated or unsaturated aldehydes and ketones, or oxidation products of polyvalent alcohols, such as glycolaldehydes, glyoxcal glyoxcyclic acid, oxalic acid, and the like, may be used for vapor phase reductions in the presence of oxides of carbon and hydrogen. Oxidation products of trivalent alcohols and divalent isomeric alcohols may also be used, of course only where it is possible to obtain the vapors of the compounds without undesired decomposition.

Aliphatic acids form another important class of compounds which can be reduced in combination with oxides of carbon. The acids include fatty acids, oxyacids, lactones, polybasic acids, ketone acids, and the like. Other miscellaneous aliphatic carbonyl compounds such as aldehyde alcohols, diketones, triketones, oxymethylene ketones, ketone aldehydes, ketone alcohols and the like, may also be combined with oxides of carbon and reduced in the presence of the contact masses described above to form many valuable products.

In addition to compounds of the aliphatic series which may be reduced together with oxides of carbon, various compounds of the cyclic series, such as for example, alicyclic compounds, for instance, cycloparaffins, cycloolefines, cyclodiolefines, may be combined with oxides of carbon and reduced. Examples of specific members of this class are cyclohexane, cyclopentadiene, dicyclopentadiene, and the like. Of course alicyclic carbonyl compounds, such as cyclohexanol, cyclohexanone, etc., may be used, it being understood in this connection and throughout the specification that any compound containing the CO group, irrespective of whether the oxygen is united to carbon with a single or a double bond, is included within the scope of the present invention.

Aromatic compounds, such as benzene hydrocarbons, naphthalenes, anthracenes, phenanthrenes, phenols, aromatic alcohols, aldehydes, ketones and acids may be reduced in the presence of oxides of carbon and hydrogen, of course only insofar as the products are capable of volatilization without undesired decomposition.

Heterocyclic compounds, such as products containing the furane nucleus, pyrrole bodies, pyrrolidines and the like, may be reduced together with oxides of carbon by means of the contact masses described in the present invention.

A number of combined reductions have been referred to briefly above, but it should be understood that other combined reductions are included in the scope of the present invention and that compounds belonging to more than one of the above enumerated groups may be simultaneously reduced with oxides of carbon.

In carrying out these complicated syntheses the permutogenetic contact masses will usually include not only reduction catalytic components and hydrogenation catalytic components but the most various types of stabilizer promoters, such as oxidation catalysts, catalysts for splitting off water, carbon dioxide or both, catalysts capable of introducing the elements of water into unsaturated hydrocarbons, dehydrogenation catalysts which favor the production of ethers, esters, acetals and the like, condensation catalysts, catalysts which favor intramolecular re-arrangement, polymerization catalysts and the like.

The invention will be described in detail in connection with the following specific examples which illustrate a few of the many reductions of carbon-oxygen compounds which fall within the scope of the present invention.

The specific examples, in accordance with the introductory portion of the specification will include phenols, alcohols and similar compounds in which oxygen is not attached to carbon by means of a double bond, but the invention does not include hydrogenations of such compounds as phenol and the like where none of the reaction takes place within the carbon-oxygen group, and such hydrogenations are specifically disclaimed.

*Example 1*

40–45 parts of $SiO_2$ in the form of a dilute waterglass solution are treated with about a 10% potassium chromite solution containing 22 parts of chromium nitrate with 9 mols of water. An approximately 10% ferrous nitrate solution is permitted to run into the mixture with vigorous agitation until the whole mass shows only a slight alkalinity to phenolphthalein. A gelatinous product is formed, separated from the mother liquor in the usual manner, and dried preferably at temperatures below 100° C. It constitutes a potassium-chromium-ferrous base exchange body which may then be reduced in a stream of hydrogen containing gases at 300° C. Prior to the reduction the exchangeable alkali may be replaced by alkaline earth metal salts. The contact mass after reduction is well suited for the production of hydrocarbons of petroleum like nature, well suited as a motor fuel when purified water gas is passed over the contact mass under pressure at 300–350° C.

It is also possible to effect the synthesis of these petroleum like hydrocarbons in intermediate stages. Thus for example, methanol may first be formed in the presence of a layer of specific methanol catalyst and then a layer of motor fuel catalyst may follow. The catalysts for the intermediate steps may advantageously contain stabilizer promoters in the form of oxidation catalysts, and when these are present in sufficient quantities, and particularly when they are present in excess, there is a tendency to produce a larger proportion of aldehydic products in the intermediate stage.

*Example 2*

A non-silicious base exchange body is prepared as follows:

30 parts of zinc nitrate containing 6 mols of water are dissolved in 100 parts of water and transformed into the potassium zincate by means of 10 N coustic potash. 15 parts of cadmium nitrate with 4 mols of water are dissolved in 200 parts of water and transformed into the corresponding potassium cadmiate by means of 10 N potassium hydroxide solution. A sodium aluminate solution is prepared by precipitating aluminum hydroxide corresponding to 10 parts of $Al_2O_3$ from a solution of an aluminum salt by means of ammonia, thoroughly washing and transforming the freshly precipitated product into sodium aluminate by means of a 2 N sodium hydroxide solution. The metallates are mixed together, and asbestos powder or pumice meal is stirred in until the mixture just remains stirrable. A solution containing 45 parts of ferric nitrate with 9 mols of water dissolved in 450 parts of water is then added to the suspension in a thin stream with vigorous agitation. The reaction product is a non-silicious base exchange body, which is pressed, dried at 100° C. and reduced in the converter system at 300° C. in a stream of hydrogen or hydrogen containing gases. The reduction should be carried out cautiously, preferably diluting the hydrogen containing cases with indifferent gases, such as nitrogen, in order to effect a smooth, well toned reduction of the complex molecule. In some cases it is desirable to carry out the reduction in the presence of steam.

The contact mass after reduction may be used for the production of petroleum like bodies from oxides of carbon, with or without hydrogen containing gases, mixed with other organic materials, such as the vapors of methyl alcohol, ethyl alcohol, methyl formate, methane, ethylene and the like. When petroleum like bodies are desired a recirculatory process should be used, or the reacting gases should be passed through a series of converters in order to exhaust them. This method is effective especially where the methane which is produced as a by-product can be effectively utilzed. The synthesis of liquid reduction products should take place at temperatures between 220-400° C., and a mixture is obtained when water gas, water gas and hydrogen, or water gas and methane are used as the raw materials. On fractional distillation of the liquid product petroleum like bodies are obtained in a fraction boiling from 30-90° C., while the higher fractions are mainly esters or alcohols, such as propyl alcohol, butyl alcohol, and the like. The catalytic effectiveness of the mass can be materially increased by using catalytically effective bodies as diluents, such as for example, salts of the metal acids of the fifth and sixth groups of the periodic system, as iron vanadate, copper vanadate, silver vanadate, cobalt vanadate, nickel vanadate, bismuth vanadate, strontium vanadate, calcium vanadate, magnesium vanadate, beryllium vanadate, barium vanadate, cadmium vanadate, zinc vanadate, cerium vanadate, manganese vanadate or chromium vanadate, singly or in admixture. Corresponding salts of molybdic, tantalic, chromic, uranic or tungstic acid can be used, with or without vanadates, singly or in admixture. Another method of introducing catalytically effective or stabilizer promoter components consists in using the salts or oxides diluted or undiluted, particularly oxides precipitated on colloidal silica or glaucosil. These oxides may be iron oxide, cobalt oxide, nickel oxide, manganese oxide, copper oxide, silver oxide, calcium oxide, tin oxide, cerium oxide, lead oxide or bismuth oxide, with or without alkaline earths or rare earths. Catalytically active natural products such as ores, for example, iron ore or copper ore, may also be used as diluents in the permutogenetic bodies. A particularly effective diluent for the synthesis of higher alcohols, ketones, aliphatic acids and heavier oils is the residue obtained from the distillation of various kinds of oil shale, which may be considered as natural catalytic compositions. These residues are effective for the synthesis of hydrocarbons of petroleum or gasoline like nature. Analyses show that the residue contains $SiO_2$, $Fe_2O_3$, CaO, MgO, $K_2O$ and $Na_2O$. Other elements may also be present in small quantities, depending on the origin of the oil shale. In order to get the most effective residue it is advantageous to distill off the oils and gases from the shale at gradually increasing temperatures in order to produce a voluminous residue. Good results are also obtained when residues are prepared by distillation with superheated steam or by destructive distillation in a vacuum. As a raw material carbon monoxide or carbon dioxide and hydrogen may be used in the presence or absence of other hydrogen containing vapors or gases, such as methane, ethylene, methyl alcohol, propyl alcohol, and the like. The hydrogen content may be in excess of the content of oxides of carbon, or vice versa.

When gases obtained in cracking processes, for example, tail gases, or from the distillation of coal are mixed with water gas and passed over the contact masses in a circulatory process at 250-350° C. under a pressure of 100-200 atmospheres, liquid hydrocarbons are obtained in addition to methyl alcohol. In order to favor the production of petroleum like bodies or paraffins, the syntheses may also be carried out at low pressure, or without pressure, the most favorable temperatures lying between 200-350° C.

*Example 3*

Methane can be effectively produced from oxides of carbon by means of contact masses containing permutogenetic bodies, especially where the reaction is carried out in converters which do not permit accumulation of heat, as for example, converters provided with automatic double counter-current heat exchange elements. A contact mass for the production of methane may be prepared as follows:

24-30 parts of $SiO_2$ in the form of a commercial sodium waterglass solution are diluted with 6-7 volumes of water and sufficient kieselguhr, pumice meal or quartz powder is added so that the mixture just remains readily stirrable. Ten parts of nickel nitrate with 6 mols of water are dissolved to a 2 N solution and mixed with an aluminum chloride solution of the same concentration containing aluminum corresponding to 2.5 parts of $Al_2O_3$. The mixture is then added to the waterglass suspension with vigorous agitation, until the reaction product and the mother liquor react slightly alkaline or neutral to phenolphthalein. The precipitated gel is pressed from the mother liquor, washed two or three times with an amount of water about equal to three times the volume of mother liquor, and then dried in the usual manner, hydrating with water if necessary and breaking into small fragments. If the kernels show insufficient strength it may be desirable to wash them before drying with a dilute sodium waterglass solution to effect surface silicification. The contact mass is then filled into a converter system and reduced with water gas or other hydrogen containing gases at 200–300° C. Carbon monoxide or carbon dioxide, or a mixture, with hydrogen or hydrogen containing gases are passed over the contact mass at 300–350° C. Excellent yields of methane are produced when sufficient hydrogen is present to permit the reaction to be carried out.

*Example 4*

Combined reductions of oxides of carbon and other organic compounds such as have been described in the introductory portion of the specification may be carried out effectively by means of contact masses containing permutogenetic bodies, and it is an advantage that a number of catalytically active components and stabilizer promoter components can be united in a single chemical compound wherever this is desirable. Great freedom of action and range of components is thereby achieved. An example of such a contact mass is prepared as follows:

10 parts of zinc hydroxide, freshly precipitated from any zinc salt solution, are transformed into the corresponding potassium zincate by means of a 2 N postassium hydroxide solution. The zincate solution is mixed with a potassium cadmiate solution prepared by transforming 15 parts of freshly precipitated cadmium hydroxide into potassium cadmiate by means of a 2 N potassium hydroxide solution. To the mixture of the two metallate solutions, 20 parts of colloidal silica or finely activated powdered carbon are added and thoroughly mixed. Thereupon a 5–10% zirconium nitrate solution containing 40–50 parts of zirconium nitrate with 5 mols of water are added to the metallate suspension with vigorous agitation until the mixture remains slightly alkaline to phenolphthalein. A precipitate is obtained consisting of a non-silicious base exchange body which contains zinc, cadmium and zirconium in non-exchangeable form. The reaction product is freed from the mother liquor in the usual manner and after pressing out the last portions of the mother liquor, is dried, preferably at temperatures below 100° C. The mass thus obtained is impregnated by trickling a 1% ammonium vanadate solution over it and then dried without washing. A product is obtained which may be considered as the vanadate of the base exchange body. This contact mass contains hydrogenation catalysts, dehydrogenation catalysts, oxidation and condensation catalysts, the latter three of course performing the role of stabilizer promoters, all combined into a product of very favorable physical characteristics.

The hydrogenation catalysts are the zinc and cadmium which may also be replaced by other amphoteric metal oxides of mild reducing activity such as lead and beryllium.

The zirconium may be considered as a dehydrogenation or condensation catalyst, and may be replaced partly or wholly by thorium, titanium, aluminum, chromium, or tri- or tetravalent vanadium. Other dehydrogenation catalysts may also be present.

The vanadate is an oxidation catalyst, and of course may be substituted by other acid radicals of the metals of the fifth and sixth groups of the periodic system, such as tantalum, bismuth, chromium, molybdenum, tungsten, or uranium, singly or in admixture.

Other combinations of components are possible. Thus for example, the hydrogenation catalysts may be introduced in the form of metal salts, or dehydrogenation catalysts may be introduced as metallates, or either or both components may be introduced in both forms.

Small amounts of waterglass solution, preferably a potassium waterglass solution, may also be used, resulting in permutogenetic products which are part zeolite and part non-silicious. Other contact mass compositions for some reactions may be obtained by embedding catalytically active components in permutogenetic bodies. Thus for example, copper vanadate, silver vanadate, lead vanadate, zinc vanadate, aluminum vanadate, cadmium vanadate, zirconium vanadate, or titanium vanadate may be embedded in permutogenetic bodies. It will be apparent that some of these diluents are combined catalysts and stabilizer promoters, as for example, copper vanadate, or others such as aluminum vanadate or zirconium vanadate, contain two different stabilizer promoter components, one being a dehydrogenation or condensation catalyst and the other an oxidation catalyst. The molybdates, tungstates or uranates can be used in place of the vanadates or mixtures may be used. Minerals containing one or more of the above enumerated elements also are excellent diluent materials.

The contact mass compositions described above are well suited for the synthesis of organic compounds from oxides of carbon and hydrogen admixed with organic compounds, such as for example, saturated alcohols $C_nH_{2n+1}OH$, such as methyl, ethyl, or propyl alcohols, or unsaturated alcohols of the general formulas—

$$C_nH_{2n-1}OH, C_nH_{2n-3}OH,$$

etc. Ethers and esters, such as methyl formate, saturated and unsaturated aldehydes and ketones, etc., aliphatic acids, such as the fatty acids, polyvalent alcohols or oxidation products of polyvalent alcohols and related compounds, polyvalent acids and related compounds, such as oxyacids, inner esters, such as phthalid and similar compounds, may be present, as described in the introductory portion of the specification. An example of such a mixture is a gas containing 5% methanol, 3% ethanol, 25% CO, 65% hydrogen and 2% nitrogen. When this mixture is passed over one of the above described contact masses in a high pressure converter, preferably provided with automatic heat exchange elements, at 350–420° C., under a pressure of 180–250 atmospheres, a more or less complex mixture of reaction products is produced 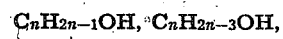 which contains propyl alcohol, isobutyl alcohol, amyl alcohol, and smaller quantities of higher alcohols and esters of these alcohols with aliphatic acids, such as acetic, propionic, etc., methyl formate, and ketones corresponding to the alcohols. The mixture may be used as such for some purposes or it may be separated into its constituents by suitable methods.

An increase in the carbon monoxide content will result in an increased proportion of free acids and ketones. It will be clear that instead of the artificial mixture of carbon monoxide and hydrogen, water gas can be used. In some cases the presence of water vapor is also favorable. The pressures mentioned above should not be considered as limiting the invention, as the maximum pressure is dependent only on the apparatus available. Preferably the syntheses are carried out in a closed circuit or else in a series of converters in order to exhaust the reaction components. Exhaust gases may be used for illuminating gas or for other syntheses of organic compounds using similar permutogenetic contact masses. When the mixture is varied, particularly when the content of hydrogen is increased, high molecular oils can be obtained, and if the amount of alkali in the contact mass is high, considerable amounts of pretroleum like bodies are obtained.

When a less complex mixture of reaction products is desired, especially when alcohols are to be obtained, the base exchange bodies may be leached in order to eliminate partly or entirely the exchangeable alkali content, and on the other hand the addition of a larger amount of alkali, particularly $K_2O$, favors the production of oils, as will an increased proportion of hydrogenation contact masses. Such reactions may be carried out at much lower pressure. The $K_2O$ appears to act both as a stabilizer and as condensation catalyst in these reactions.

Instead of using a single contact mass the gases may be passed over a layer of methanol catalyst, in order to obtain the methanol percentage in the vapor mixture, and the partly reacted gases may then be passed over one of the contact masses described above.

Example 5

The following contact mass is prepared:

4 parts of $Al_2O_3+3H_2O$, freshly precipitated from any aluminum salt solution, are transformed into the corresponding aluminate by means of a 2 N potassium hydroxide solution.

15 parts of freshly precipitated cadmium hydroxide are also transformed into the corresponding potassium cadmiate in the usual manner.

16 parts of hydrated $V_2O_4$ are dissolved in 10 N sodium hydroxide solution to form sodium vanadite.

Finally, 2.5 parts of zinc hydroxide are dissolved in a 2 N sodium hydroxide solution to produce sodium zincate.

These metallate solutions are then mixed together, and a non-silicious base exchange body is precipitated by the help of salt solutions containing zirconium, titanium, thorium, manganese, and tin in equimolecular proportions. The solution may advantageously be of about 10% strength, and is added with vigorous agitation until the reaction product is neutral or slightly alkaline to phenolphthalein. The resulting product is freed from the mother liquor, dried, hydrated by trickling water over it, and impregnated with a 10% ammonium metatungstate solution after hydration. A second drying follows, and the dried product is then carefully leached with about a 5% dilute nitric acid solution in order to eliminate a maximum of alkali. This results in a considerable loss of mechanical strength of the contact mass kernels, and in order to provide for a satisfactory mechanical strength they may be mixed with a natural gum, dried, and broken into suitable pieces. This contact mass can be used for the synthesis of alcohols and liquid hydrocarbons, using as a raw material gaseous mixtures containing paraffins, hydrocarbons, olefines, acetylenes, and other unsaturated hydrocarbons, cycloparaffins, cycloolefines, aromatic compounds, such as the compounds of low temperature tar, for example, phenols, aromatic alcohols, ketones, aromatic nitrogen compounds, heterocyclic bodies, such as furane, etc., mixed with oxides of carbon and hydrogen containing gas such as water gas. A specific gas composition is 20% ethylene or its homologues, 10% carbon monoxide, 65% hydrogen and 5% nitrogen. Other gases which do not have a deleterious effect on the contact mass, such as carbon dioxide or water vapor, are in some cases advantageous. The gas mixture is passed over the contact mass at 300–400° C., at 80–160 atmospheres. Low boiling liquid hydrocarbons of petroleum-like nature are obtained, the main fraction going over at 35–65° C., and possessing a specific gravity of 0.73 to 0.74 at 20° C. Small quantities of alcohols, aldehydes, and ketones are obtained as by-products.

When phenolic bodies are present, they are for the most part transformed into aromatic hydrocarbons. Thus for example, phenol is transformed for the most part into benzene. These syntheses can be carried out in a closed circuit or in a series of converters, and it is an advantage of the process that the contact mass does not favor the decomposition of carbon. Instead of the specific mixture referred to above, hydrocarbon mixtures, especially those containing unsaturated hydrocarbons, for example, the olefines of natural gas, coal gas, or low temperature carbonization gases, or the tail gases from cracking petroleum may be used. These gas mixtures may be of very complex character.

These syntheses can be carried out in a plurality of converters with these especially efficient contact mass compositions which contain hydrogenation catalysts, dehydrogenation catalysts, polymerization catalysts, and catalysts for intramolecular rearrangement. The different contact masses may be arranged in zones or layers, or mixed together. When recirculation in a closed circuit is used the introduction of the fresh gases may be effected so as to maintain a fairly constant composition, but this is not really essential, and the adjustment of composition may be approximate. In some cases a very markedly decreased pressure may be utilized.

When it is desired to completely avoid the formation of alcohols and esters, it is advantageous to include iron, cobalt and manganese in the contact mass, and the pressure should also be greatly reduced, and the reaction may even be carried out at atmospheric pressure.

When the catalytic efficiency of such contact masses becomes weakened they may be regenerated by treating them with oxygen containing gases at 380–450° C., and after the oxidation is complete the contact mass can be again reduced with hydrogen containing gases, such as water gas, whereupon its effectiveness is renewed.

Example 6

Gases or vapors for the synthesis of alcohols and hydrocarbons may be preliminarily treated with oxygen containing gases to partly oxidize their hydrocarbon content. Thus for example, natural gas, coal gas, the gas from the low temperature carbonization of coal, and tail gases from the cracking of petroleum may be so treated. These combined methods of synthesis may be carried out in a plurality of converters, the first being provided with oxidation catalysts and small amounts of oxygen being introduced into the gas stream. If air is used the nitrogen remaining after the synthesis is completed may be used for the synthetic production of ammonia. This incomplete combustion may be also effected by the so-called surface combustion methods. The contact mass for the partial oxidation of such hydrocarbon mixtures may be prepared as follows:

210 parts of 33 Bé. potassium waterglass solution diluted with 6-8 volumes of water are mixed with sufficient finely divided kieselguhr so that the suspension just remains easily stirrable. To this mixture a potassium vanadite solution is added which may be prepared by reducing 18 parts of $V_2O_5$ in 250 volumes of water at an elevated temperature with sulfur dioxide in the presence of dilute sulfuric acid, decomposing the blue vanadyl sulfate obtained with alkali, and transforming the $V_2O_4$ precipitated into a coffee-brown solution of potassium vanadite with just sufficient 5 N. caustic potash solution. To the mixture of waterglass and vanadite a 10% aluminum sulfate solution is added in a thin stream with vigorous agitation until the reaction mixture is neutral or just alkaline to phenolphthalein. The mass solidifies to a dirty green gel, which is filtered with suction, washed slightly and dried. Other metal salt solutions may replace the aluminum partly or wholly, especially solutions of salts of amphoteric metals, such as iron sulfate, zirconium nitrate and the like.

The permutogenetic body obtained is well suited for the partial oxidation of gases. For example, illuminating gases or the tail gases from the cracking of petroleum are mixed with small amounts of oxygen or the corresponding amounts of air and led over the contact masses at 360–400° C. The mixture is partially oxidized and it may then be directly used for the synthesis of alcohols or other oxygenated compounds or hydrocarbons using one or other of the contact masses described in the foregoing examples.

Other contact masses containing metal elements of the fifth and sixth groups of the periodic system are well suited for the partial oxidation of the hydrocarbons, and these contact masses may be toned by stabilizers or stabilizer promoters.

A combination of oxidation catalysts, water gas catalysts and catalysts for the synthesis of oxygenated organic compounds or hydrocarbons is also effective, the water obtained in the catalysis being used in the water gas catalysis and the mixture of gases thus obtained being well suited for the specific syntheses of the present invention.

In the specification and claims the term "permutogenetic" covers base exchange bodies, silicious or non-silicious, the products obtained by the acid leaching of these base exchange bodies and salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

This application is a division of my co-pending application Serial No. 256,065, filed February 21, 1928.

What is claimed as new is:

1. A method of catalytically reducing compounds of the group consisting of oxides of carbon and compounds of more than one carbon atom containing carbon linked to oxygen to products containing hydrocarbons which comprises causing them to react with reducing gases in the presence of a contact mass containing a permutogenetic body.

2. A method of catalytically reducing compounds of the group consisting of oxides of carbon and compounds of more than one carbon atom containing carbon linked to oxygen to products containing hydrocarbons which comprises causing them to react with reducing gases in the presence of a contact mass containing a permutogenetic body and also containing at least one strong reduction catalyst included in the group consisting of iron, nickel, cobalt, platinum metals.

3. A method according to claim 1 in which a strongly alkaline compound of alkali forming metals is present in the contact mass.

4. A method according to claim 2 in which a strongly alkaline compound of alkali forming metals is present in the contact mass.

5. A method according to claim 1 in which the contact mass contains a strongly alkaline compound of alkali forming metals, and also contains a non-specific catalyst selected from the group consisting of oxidation catalysts, dehydration catalysts, dehydrogenation catalysts, and condensation catalysts.

6. A method according to claim 2 in which the contact mass contains a strongly alkaline compound of alkali forming metals, and also contains a non-specific catalyst selected from the group consisting of oxidation catalysts, dehydration catalysts, dehydrogenation catalysts, and condensation catalysts.

7. A method according to claim 1 in which the contact mass contains a strongly alkaline compound of alkali forming metals, and also contains a condensation catalyst.

8. A method according to claim 2 in which the contact mass contains a strongly alkaline compound of alkali forming metals, and also contains a condensation catalyst.

9. A method of producing reduction products containing hydrocarbons which comprises reducing oxides of carbon in the presence of a contact mass containing a permutogenetic body.

10. A method of producing reduction products containing hydrocarbons which comprises reducing oxides of carbon in the presence of a contact mass containing a permutogenetic body and also containing at least one strong reduction catalyst included in the group consisting of iron, nickel, cobalt, platinum metals.

11. A method according to claim 9 in which the contact mass contains strongly alkaline compounds of alkali forming metals.

12. A method according to claim 10 in which the contact mass contains strongly alkaline compounds of alkali forming metals.

13. A method according to claim 9 in which the contact mass contains strongly alkaline compounds of alkali forming metals, and contains a non-specific catalyst selected from the group consisting of oxidation catalysts, dehydration catalysts, dehydrogenation catalysts, and condensation catalysts.

14. A method according to claim 10 in which the contact mass contains strongly alkaline compounds of alkali forming metals, and contains a non-specific catalyst selected from the group consisting of oxidation catalysts, dehydration catalysts, dehydrogenation catalysts, and condensation catalysts.

15. A method according to claim 9 in which the contact mass contains strongly alkaline compounds of alkali forming metals, and contains a condensation catalyst.

16. A method according to claim 10 in which the contact mass contains strongly alkaline compounds of alkali forming metals, and contains a condensation catalyst.

17. A method according to claim 9 in which the vapors of other reducible organic compounds are admixed with the oxides of carbon before reduction.

18. A method according to claim 10 in which the vapors of other reducible organic compounds are admixed with the oxides of carbon before reduction.

ALPHONS O. JAEGER.